United States Patent [19]

Miles

[11] Patent Number: 4,671,330
[45] Date of Patent: Jun. 9, 1987

[54] CONTAINER WITH REMOVABLE TRANSFER FLASK

[76] Inventor: Gilbert Miles, Teatown Rd., Croton-on-Hudson, N.Y. 10520

[21] Appl. No.: 665,384

[22] Filed: Oct. 26, 1984

[51] Int. Cl.⁴ .............................................. B67C 9/00
[52] U.S. Cl. ..................................................... 141/24
[58] Field of Search .............................. 141/2, 23, 24

[56] References Cited

U.S. PATENT DOCUMENTS 3,158,183 11/1964 Brown et al. .......................... 141/24
3,379,196 4/1968 Mitchell ............................ 141/24 X
3,592,245 7/1971 Schneller ........................... 141/24 X Primary Examiner—Stephen Marcus
Assistant Examiner—Mark Thronson
Attorney, Agent, or Firm—Kane, Dalsimer, Kane, Sullivan and Kurucz

[57] ABSTRACT

A system for withdrawing, transporting and dispensing predetermined portions of liquid from a container with multiple portion capacity includes a dip tube assembly disposed within the container including a dip tube which extends into the container and a receiving device for matingly receiving a transfer flask. The dip tube assembly includes a plurality of apertures adapted to enable filling of and pouring from the container when the transfer flask is removed therefrom. The transfer flask is removably mounted on the receiving device and has a predetermined liquid storage capacity and walls which are deformable upon application of pressure thereto, wherein said walls elastically return to their original shape upon release of pressure therefrom, said transfer flask also having an opening in communication with the dip tube so that liquid is drawn into the transfer flask upon expansion of the walls of the transfer flask. In addition, the transfer flask is removably secured to the receiving device so that it acts as a closure for the container during shipping and storage.

3 Claims, 6 Drawing Figures

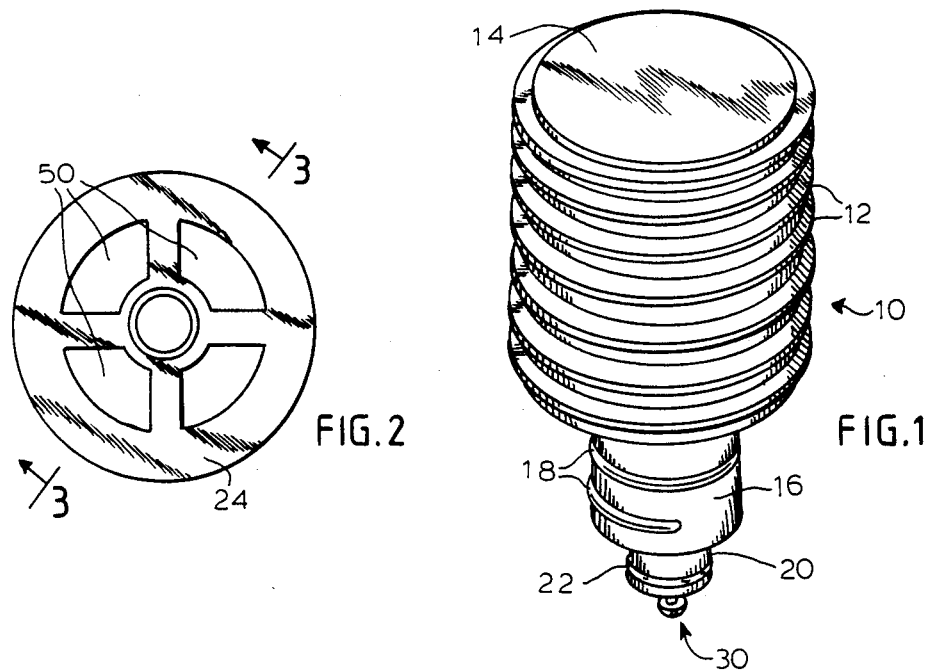
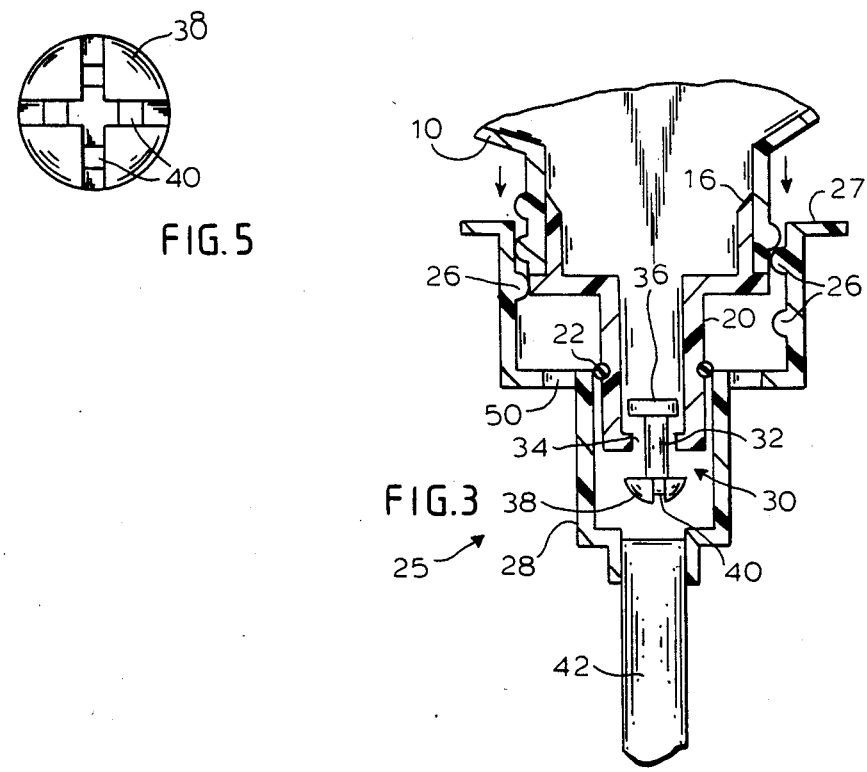

CONTAINER WITH REMOVABLE TRANSFER FLASK

BACKGROUND OF THE INVENTION

The present invention relates to the field of liquid storage and dispensing and more particularly to a system for removing measured amounts of liquid from storage vessels so that they may be transported to and dispensed at any desired location.

In recent years the variety of commonly used household liquid products has increased dramatically. Many of these products are purchased in containers that provide enough product for a large number of applications. These so called "family" size packages offer the purchaser an economy of scale and freedom from the need to shop frequently. As a result package sizes have been increased to the point where many are quite large in size, and correspondingly heavy. This fact increases the awkwardness associated with transporting, measuring and dispensing household liquids. Some containers, such as liquid laundry detergents, may hold a gallon of liquid and weigh eight to twelve pounds, while the unit dose is only one half cup per wash. Lifting and pouring from such a package is a laborious task and is combined with the inconvenience of cleaning the measuring cup and/or any spills. Regarding spills, it is important to note that detergent spills are a lot safer to handle than hydrochlorite, organic solvents, insecticides, weed killers and disinfectants, all of which may be used in measured dosage. Furthermore, the measurement and dispensing may have to occur under conditions of poor lighting or in a non-stationary environment. Examples of such situations include dispensing medication at night or aboard a plane, train or ship. These are a few conditions which create the need for the present invention. It is also clear that any system that solves these problems will be particularly useful if it also provides the flexibility of permitting the products use by pouring directly from the container when measurement is not needed.

Commonly, with present dispensing systems, when a measured amount of liquid is desired additional problems arise. The measuring container used becomes covered with the working liquid and must be cleaned after use. In addition, common measuring devices such as cups, bulbs, and spoons are messy and awkward to use and require tilting of the storage container to dispense the measured amount. Another common measuring device, an eye dropper, is subject to the problem of dripping. In addition, the outside surface of the eye dropper is covered with liquid during and after use and therefor requires cleaning.

A further problem in dispensing liquids arises in nonstable environments such as airplanes, boats, trains, and the like. The necessity of pouring has commonly led to spillage in such environments. In the past, numerous liquid storage and dispensing apparatus have been used. U.S. Pat. No. 4,327,782 (McKibben et al) discloses a dispensing apparatus having portable means for dispensing a predetermined quantity of liquid from a bulb container. However, with the McKibben et al device, the transfer flask is simply dipped into the dip tube. It may not be used as a closure and consequently a separate closure must be provided. In addition, because the transfer flask is generally detached from the container it is often not handy when desired. Further, the McKibben et al device does not allow filling of the container or pouring from the container when the dip tube assembly is in place. In such a device the structure of the dip tube is limited by the fact that the dip tube must be capable of emptying the storage vessel. Nor does McKibben et al disclose a safety valve associated with the transfer flask to prevent dripping during transport to a dispensing site.

As can be seen from the above discussion the storage and dispensing of liquids commonly requires either the transportation of heavy liquid storage containers, or a dispensing procedure which is conducive to liquid spillage.

SUMMARY OF THE INVENTION

The primary object of the present invention is to provide a system for withdrawing, transporting and dispensing predetermined portions of liquid from containers with multiple portion capacity with the present device. A user of liquid contained in a storage container, for example laundry detergent, may cleanly remove a measured amount of laundry detergent and conveniently transport that measured amount of liquid to a dispensing location.

Disadvantages of prior art devices are overcome in the present invention by providing a dip tube assembly having a receptacle means which matingly receives a neck portion of a transfer flask and is adapted to secure the transfer flask thereto so that the transfer flask acts as a closure during shipping and storage. The dip tube assembly is further provided with a plurality of apertures located radially outward from the dip tube to allow unobstructed filling of the container and pouring from the container when the transfer flask is removed from the container. The transfer flask, which communicates with a receiving means associated with the dip tube assembly, has a predetermined liquid storage capacity, and walls which are deformable upon application of pressure thereto. The walls of the transfer flask elastically return to their original shape upon release of pressure therefrom, the transfer flask also having an opening in communication with the dip tube so that liquid is drawn into the transfer flask when the walls of the transfer flask expand to their original shape. Another object of the present invention is to enable a domestic user to purchase a larger, economy or industrial size container of liquid product while enjoying the convenience of lightweight transport and ease of application during home use. For example, using the device disclosed herein, a housewife may now use a large and heavy container of liquid product which, in the past, would have proven unmanageable due to the need to either transport, or pour from, the container.

An example of an advantageous use of the present invention is in taking a measured dosage of medicine. With the present device on awaking at night in the dark one may extract a measured dosage of for example, cough medicine without turning on a light and without pouring into a spoon. Ease of handling and measuring safety is increased so that a child of suitable age and discretion may take cough medicine without parental assistance. Another advantageous use is in using weed killer or disinfectants. A measured amount of product may be withdrawn while the user's hands are protected from contamination without the use of gloves. Thus it is evident that the present invention provides a super safety device.

A further object of the present invention is to provide a resilient transfer flask which may act as a sealed closure for a container during shipment and storage, a pump, and a dispenser.

These and other objects and advantages will become apparent from the following detailed description which is to be taken in conjunction with the accompanying drawings.

BRIEF DESCRIPTION OF THE DRAWINGS

FIG. 1 is a front perspective view of the transfer flask of the present invention.

FIG. 2 is a view from below of the dip tube assembly shown in FIG. 3.

FIG. 3 is a section view of the coupling components of the transfer flask and dip tube assembly, prior to coupling, with arrows illustrating the direction for coupling.

FIG. 5 is a view from below of the valve plug of FIGS. 3 and 4.

DETAILED DESCRIPTION OF THE PREFERRED EMBODIMENT

Figure 4:
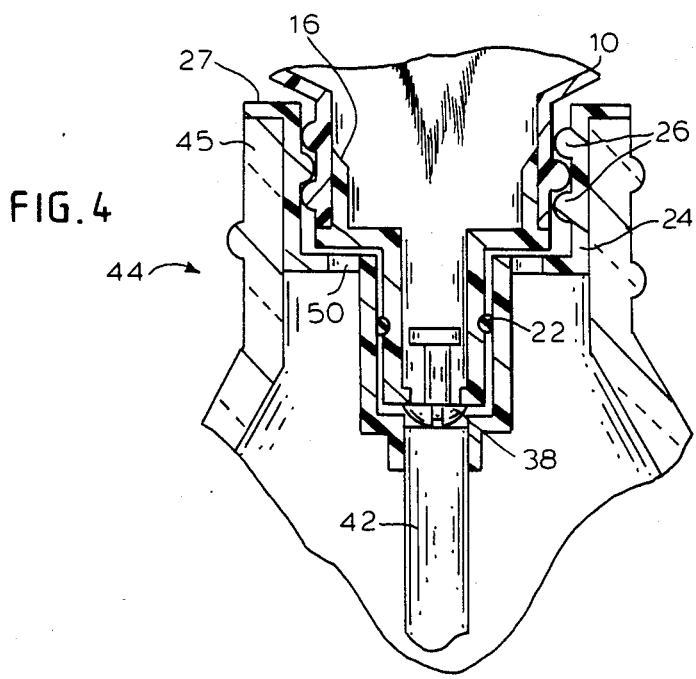
FIG. 4 is a section view of the transfer flask coupled to the dip tube assembly which is disposed within a container.

Referring now to the drawings FIG. 1 illustrates transfer flask 10 of the present invention. The transfer flask contains collapsible walls and, in the preferred embodiment, these walls comprise a hollowed bellows portion 12. The bellows portion may be composed of any suitable material, for example a resinous material such as polyethylene or polypropylene. Upon application of downward pressure to top 14 the bellows portion of the transfer flask is compressed and air is expelled from the flask. In addition, upon release of pressure from top 14, bellows portion 12 elastically returns to its original expanded configuration creating an area of decreased pressure within the bellows portion. Liquid flows into the transfer flask to reduce the vacuum created therein until an equilibrium pressure is reached. A spring device may be employed to assist the expansion of the flexible flask walls in order to create the necessary suction to draw liquid from the transfer flask into the dip tube.

Transfer flask 10 contains a coupling neck 16 extending downwardly from the bellows portion and may have an external thread 18 thereon. A transfer neck 20 having an O-ring seal 22 disposed on an external surface thereof extends downwardly from the coupling neck. Coupling neck 16 and transfer neck 20 are adapted to be matingly received by coupling collar 24, having internal threads 26, and transfer collar 28 respectively. Dip tube assembly 25 is mounted to a container 44 (See FIG. 4.) by a mounting flange 27, and a friction fitting, and comprises threaded coupling collar 24, transfer collar 28, and dip tube 42. The coupling between the dip tube assembly and the transfer flask may be located external of the container. This construction may be advantageously applied with large industrial storage drums. The container 44 may be composed of any conventional material such as plastic or glass.

Figure 6:
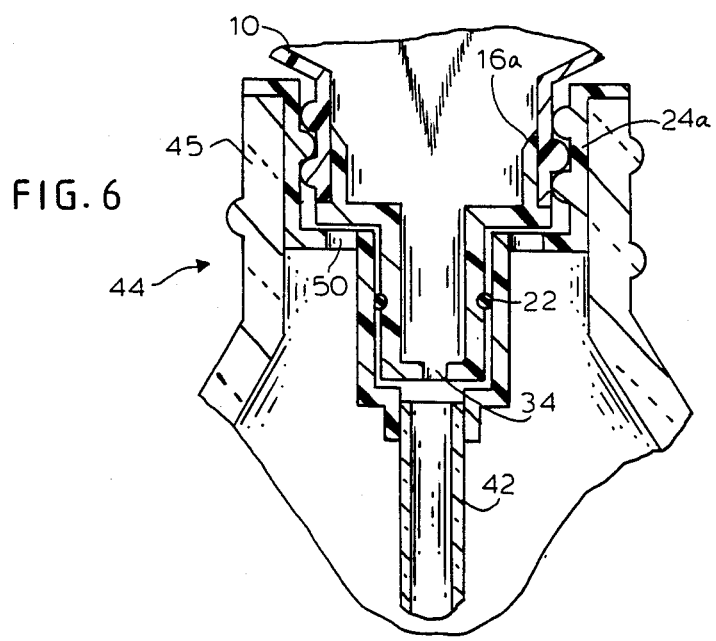
FIG. 6 is a section view of an alternate embodiment of the present invention wherein the transfer flask is slidably engaged to the dip tube assembly.

As illustrated in FIGS. 3 and 4 the transfer flask is preferably threadingly engaged to the dip tube assembly. O-ring 22 contacts the walls of transfer collar 28 to provide a running seal between the dip tube assembly 25 and the transfer flask. The seal between the transfer flask and the dip tube must be a slidable seal. The sliding seal advantageously employed in the exemplary embodiments is illustrated in FIG. 6. Threaded engagement, while not essential to the present invention, does enable the transfer flask to be used as a fluid tight cap for the supply container. In this manner the transfer flask serves as a closure during shipment and storage of the container, a vacuum pump for drawing liquid out of the storage container, and a dispenser for applying a measured amount of liquid at a desired location.

A dip tube 42 is affixed to a cylindrical lip of transfer collar 28 by any suitable means, for example, by friction fitting. Dip tube 42 extends downwardly into container 44 in order to draw liquid therefrom, and communicates with the transfer flask through transfer collar 28 and transfer neck 20 so that liquid within container 44 is drawn into transfer flask 10 when a vacuum is created in the transfer flask by the expansion of bellows portion 12.

In FIGS. 3 and 4 a pressure actuated valve plug 30 is shown having a shaft portion 32 which passes through opening 34 of the transfer flask. The function of shaft portion 32 is to unseat stopper portion 36 during transfer of liquid from container 44 to the transfer flask and permit discharge when tip 38 is pressed upward. The valve plug contains a non-porous stopper portion 36 affixed to the end of shaft 32 which is disposed within the transfer flask, and a head 38, containing flow passages 40 (see FIG. 5), on the end which is external to the transfer flask. Passages 40 provide a discharge air passage when the transfer flask is in place in the storage container. Valve plug 30 is employed to eliminate dripping during transport of the transfer flask. Alternately opening 34 may be kept small enough so that little or no dripping occurs. When no valve plug is used to seal aperture 34, the user, after filling the transfer flask, may invert the transfer flask so that no dripping occurs.

To expel air from the transfer flask prior to filling the flask, bellows portion 12 is squeezed so that it contracts. Expelled air passes from the bellows portion through passages 40 in plug head 38. Downward movement of valve plug 30 is prevented during the expelling of air by head 38 contacting annular ridge 46. The expelled air passes through the dip tube and bubbles upwardly through the liquid into the headspace of the container. Note that the flask may be squeezed, and air expelled, prior to insertion into the dip tube assembly. The transfer flask may also be inverted during expelling of air to unseat valve plug 30.

As illustrated in FIG. 4, during the drawing of liquid from container 44, liquid is drawn from container 44 through passages 40 in plug head 38, then into the transfer flask. When the transfer flask is removed from the container gravity acts to rapidly force the valve plug downwardly so that stopper 36 is seated on annular ridge 46, thereby sealing opening 34 to prevent dripping during transport of the transfer flask. To dispense fluid from the transfer flask, head 38 of valve plug 30 is placed in contact with any surface and the walls of the transfer flask are squeezed. In this manner stopper 36 is lifted from its seated position and liquid within the transfer flask is forced out through opening 34.

When transfer flask 10 is not coupled to supply container 44 liquid may readily be poured from the container and, the container interior vented through ports 50 in coupling collar 24.

FIG. 6 illustrates coupling neck 16a engaged to coupling collar 24a. A valve plug is not provided, opening 34 being small enough to prevent or minimize dripping. Once again, seal 22 is optional in both embodiments shown in the drawings.

Transfer flasks of varying sizes may be provided to meet the needs of user. Alternately, the walls of the transfer flask of the present invention could be made transparent or semi-transparent, and measuring lines added thereto, to enable the user to determine the volume of the liquid in the transfer flask. In another embodiment a syringe-type transfer container could be employed as an alternate to the collapsible transfer flask in order to provide greater accuracy in dosage or the like.

Thus it is evident that the object of clean and convenient drawing, transfer, and dispensing of measured amounts of liquid from a storage container is achieved by the device described. Although a preferred embodiment of the invention has been disclosed and described in detail herein, it should be understood that this invention is in no sense limited thereby and its scope is to be determined by that of the appended claims.

What is claimed is:

1. A system for withdrawing, transporting and dispensing predetermined portions of liquid from containers with multiple portion capacity comprising:
   a container for storing liquids;
   a dip tube assembly comprising a dip tube which extends into the container, and receiving means for receiving a transfer flask;
   a transfer flask mounted on the receiving means having a predetermined liquid storage capacity, and having walls which are deformable upon application of pressure thereto, wherein said walls elastically return to their original shape upon release of pressure therefrom, said transfer flask also having an opening is fluid communication with the dip tube so that liquid is drawn into the transfer flask from the container when the walls of the transfer flask expand to their original shape;
   at least one aperture in the dip tube assembly for filling of and pouring from the container when the transfer flask is removed therefrom;
   a means for securing the transfer flask to the container so that the transfer flask acts as a closure for the container during shipping and storage;
   and wherein the transfer flask contains a neck portion which is adapted to be matingly inserted into the receiving means of the dip tube assembly in order to provide an efficient fluid communication between the transfer flask and the container;
   and wherein a fluid-tight seal is provided between the receiving means and the neck portion of the transfer flask;
   and wherein the means for securing the transfer flask to the container comprises threading on the transfer flask and the receiving means for threading engagement therebetween; and
   a valve means disposed between the neck portion and the receiving means in order to prevent leakage of liquid from the transfer flask, wherein said valve means is further adapted to enable the flow of liquid therethrough during transfer of liquid from the container to the transfer flask 2. An apparatus in accordance with claim 1 wherein the valve means comprises a valve plug having a stopper portion disposed within the transfer neck, a shaft portion affixed to the stopper portion and extending through the opening in the transfer flask and a head portion which is affixed to the shaft portion external to the transfer flask, the head portion having apertures therein to allow liquid to flow therethrough.

3. A system for withdrawing, transporting and dispensing predetermined portions of liquid from containers with multiple portion capacity comprising:
   a container for storing liquids;
   a dip tube assembly comprising a dip tube which extends into the container, and receiving means for receiving a transfer flask;
   a transfer flask mounted on the receiving means having a predetermined liquid storage capacity, and having walls which are deformable upon application of pressure thereto, wherein said walls elastically return to their original shape upon release of pressure therefrom, said transfer flask also having an opening in fluid communication with the dip tube so that liquid is drawn into the transfer flask from the container when the walls of the transfer flask expand to their original shape;
   at least one aperture in the dip tube assembly for filling of and pouring from the container when the transfer flask is removed therefrom;
   a means for securing the transfer flask to the container so that the transfer flask acts as a closure for the container during shipping and storage;
   and wherein the transfer flask contains a neck portion which is adapted to be matingly inserted into the receiving means of the dip tube assembly in order to provide an efficient fluid communication between the transfer flask and the container;
   and wherein the receiving means comprises a hollow cylindrical coupling collar and a hollow cylindrical transfer collar, of smaller diameter than the coupling collar, and extending from a bottom portion thereof, said transfer collar having the dip tube affixed thereto and extending downwardly therefrom, the passage within the dip tube communicating with the hollow collars of the transfer flask, and wherein the neck portion of the transfer flask comprises a hollow cylindrical coupling neck adapted to be threadingly engaged to the coupling collar of the receiving means, and a hollow cylindrical transfer neck of smaller diameter than the coupling neck disposed below the coupling neck containing the opening of the transfer flask, and adapted to be matingly received by the transfer collar of the receiving means;
   and wherein the coupling neck of the transfer flask contains an O-ring disposed externally about a perimeter thereof, said O-ring contacting the transfer collar providing a fluid tight seal between the transfer flask and dip tube assembly.

* * * * *